C. H. NICHOLS.
MUD GUARD FOR THE WHEELS OF MOTOR AND OTHER VEHICLES.
APPLICATION FILED DEC. 12, 1910.

1,021,724.

Patented Mar. 26, 1912.

Witnesses

Inventor
C. H. Nichols
his Attorneys

UNITED STATES PATENT OFFICE.

CHARLES HILLYARD NICHOLS, OF WOLVERTON, ENGLAND.

MUD-GUARD FOR THE WHEELS OF MOTOR AND OTHER VEHICLES.

1,021,724.    Specification of Letters Patent.    Patented Mar. 26, 1912.

Application filed December 12, 1910. Serial No. 596,907.

*To all whom it may concern:*

Be it known that I, CHARLES HILLYARD NICHOLS, a subject of the King of Great Britain and Ireland, residing at 40 Shatford road, Wolverton, Buckinghamshire, England, have invented certain new and useful Improvements in Mud-Guards for the Wheels of Motor and other Vehicles; and I do hereby declare the following to be a full, clear, and exact description of the invention, such as will enable others skilled in the art to which it appertains to make and use the same.

This invention relates to mud guards for wheels of motors and other vehicles and refers to that class of guards which are fitted to the sides of the wheels for intercepting the mud splashing laterally from the tire and are attached to the vehicle by means of a ring or the like provided with means for attachment to the hub, an outer ring being also furnished mounted rotatably with respect to the inner ring with ball bearings interposed between the rings, the outer ring having attached to it a mud guard which may be in the form of a sector of a circle depending at the side of the wheel and formed of some suitable material such as canvas, leather, chainwork or the like. My present invention refers to new and advantageous constructional improvements in mud guards of this type.

For suspending the mud guard sector from the outer ring I provide a simple pivot, or I may extend the outer ring or attach a plate thereto having a groove or grooves therein and provide the mud guard with a roller or rollers working in the said groove. A counterbalance weight may be attached to the outer ring to assist in keeping it in its vertical position or a spring or springs may be provided for this purpose.

The accompanying drawing illustrates one method of carrying out my invention.

Figure 1:
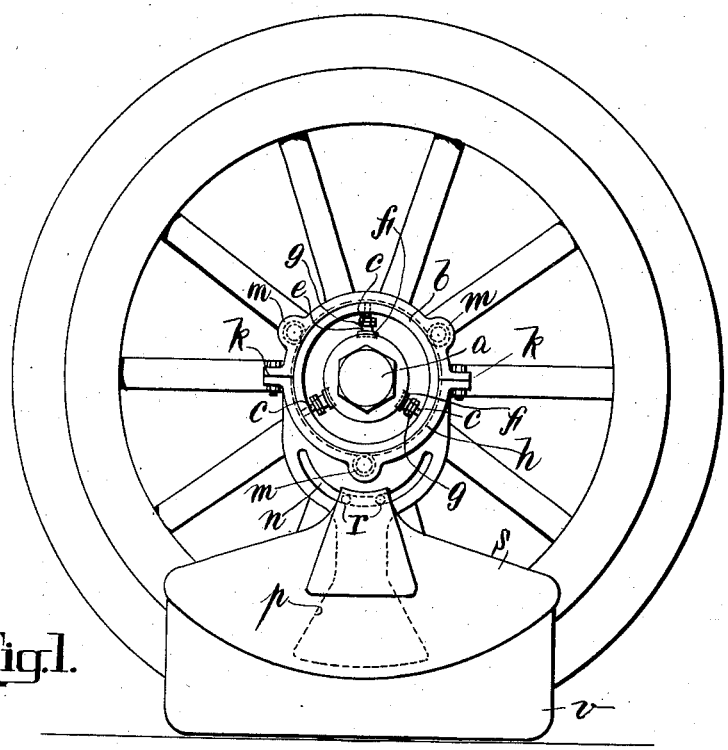
Figure 2:
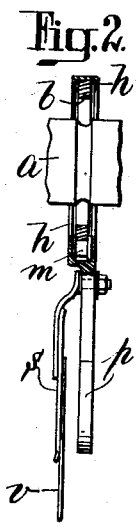
Figure 3:
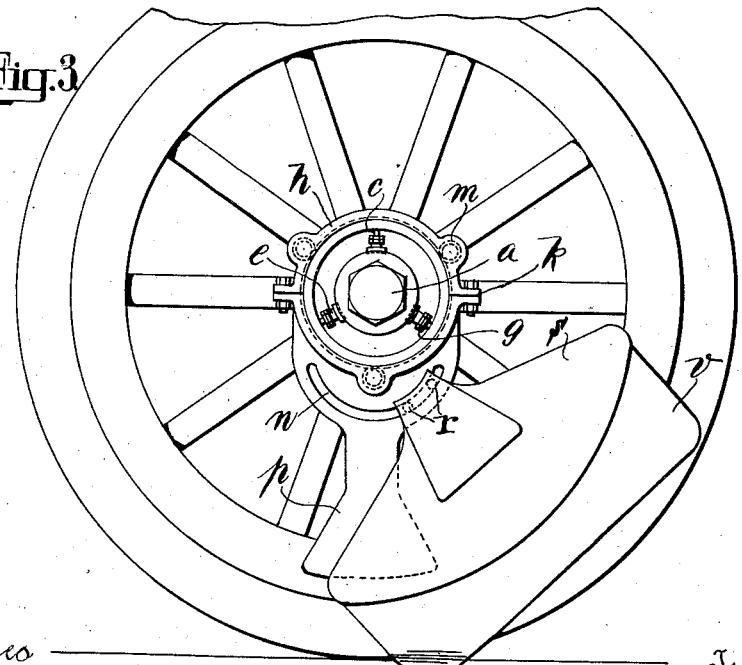

In the drawing:—Figure 1 shows a side elevation of a wheel with my mud guard applied thereto. Fig. 2 shows an elevation partly in section at a right angle to Fig. 1; Fig. 3 shows a similar view to Fig. 1 with the mud guard in an inclined position.

The same letters of reference are employed to denote the same parts in all the views.

$a$ is the hub, $b$ is a steel ring. This ring is provided with a number of stretchers each comprising a screw $c$ fixed to the ring $b$ provided with a sleeve nut $e$, carrying at its outer end a shoe $f$ capable of rotating with respect to the sleeve $e$.

$g$ is a lock nut.

$h$ is another ring made in two parts which can be bolted together at $k$. This outer ring $h$ is formed with a number of housings for the reception of flanged rollers $m$, which engage the ring $b$. The lower portion of the ring $h$ is provided with a downwardly extending portion. $n$ is a slot cut therein. The extension is further prolonged into a counterbalance weight $p$. The slot $n$ as will be seen from the drawing forms part of a circular arc struck from a center below the center of the hub of the wheel. $r$ are two studs which travel in the slot $n$. These are attached to a pendent piece $s$ which forms part of the lateral mud guard $t$, which as before stated, is a sector of a circle in shape. This guard is provided with an extension $v$ of leather.

In attaching the device the steel ring $b$ is clamped firmly to the hub $a$ of the wheel by the stretchers $c$ and their associated parts. The parts of the ring $h$ are then clamped together with the rollers $m$ arranged in their proper positions with respect to the ring $b$. The studs or rollers $r$ pass through the slots $n$ and are secured movably in position by suitable nuts and washers or other retaining devices.

At Fig. 1 the mud guard is shown in its normal position with the leather flap $v$ intercepting all mud thrown laterally by the tire of the wheel. In the event of the guard striking a stone or other obstacle it swings up as shown at Fig. 3, where it will be observed that owing to the eccentricity and size of the slot $n$ the extremity of the guard swings within the circumference of the wheel instead of projecting therefrom and consequently there is no risk of a person being struck by a protruding guard.

It will be understood that the method of constructing the device with reference to the accompanying drawing is shown by way of example. In place of employing a leather flap $v$ to form the portion of the guard for intercepting the mud or the like thrown off from the wheel I may employ any suitable fabric, such as canvas. In place of employing studs or rollers such as those shown, I may fork the ends of the guard portion so that they come on either side of the slotted plate, and provide any suitable devices for operating in the slot. In some cases the counterbalance weight may be dispensed with and springs utilized for keeping the devices in the vertical position, and in other cases a spring or springs may be furnished in addition to the counterbalance weight. Moreover, although I have described and shown the slot $n$ as forming a part of a circular arc it will be understood that the slot may be of any formation or curvature provided that when the mud guard receives a shock and is moved in either direction the extremity of the guard tends to come within the circumference of the wheel and not to protrude beyond it.

What I claim and desire to secure by Letters Patent of the United States of America is:—

1. The combination with a vehicle wheel of a ring, adjustable means interposed between the inside of the ring and the hub of the wheel for securing same together, an outer ring rotatably mounted on the first ring, a balance weight depending from the outer ring tending to keep the outer ring in normal position, the outer ring having a slot therein arranged on the arc of a circle struck from a point below the center of the outer ring, a guard, and rollers carried by the guard and interposed in the slot, substantially as described.

2. The combination with a vehicle wheel of a ring, stretchers interposed between the inside of the ring and the hub of the wheel for securing same together, an outer ring, flanged rollers mounted on the outer ring for engaging the periphery of the first ring and for keeping said rings in rotatable engagement, a balance weight depending from the outer ring, the outer ring being provided with an eccentric slot arranged in its lower portion, a sector, rollers carried by the sector and interposed in said slot, and flexible means depending from the sector, substantially as described.

In testimony whereof, I affix my signature, in presence of two witnesses.

CHARLES HILLYARD NICHOLS.

Witnesses:
A. E. VIDAL,
L. SIMMOND.

---

Copies of this patent may be obtained for five cents each, by addressing the "Commissioner of Patents, Washington, D. C."